US009450503B2

(12) United States Patent
Wagoner et al.

(10) Patent No.: US 9,450,503 B2
(45) Date of Patent: Sep. 20, 2016

(54) POWER CONVERTER WITH A MULTI-LEVEL BRIDGE TOPOLOGY AND CONTROL METHOD

(71) Applicant: General Electric Company, Schenectady, NY (US)

(72) Inventors: Robert Gregory Wagoner, Roanoke, VA (US); Allen Michael Ritter, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 13 days.

(21) Appl. No.: 13/967,437

(22) Filed: Aug. 15, 2013

(65) Prior Publication Data
US 2015/0049524 A1 Feb. 19, 2015

(51) Int. Cl.
*H02M 7/483* (2007.01)
*H02M 7/487* (2007.01)
*H02M 5/458* (2006.01)

(52) U.S. Cl.
CPC ............. *H02M 5/458* (2013.01); *H02M 7/483* (2013.01); *H02M 7/487* (2013.01); *Y02E 10/76* (2013.01)

(58) Field of Classification Search
CPC ................... H02M 7/483; H02M 2007/4835; H02M 7/487
USPC .................................................. 363/37, 136
See application file for complete search history.

(56) References Cited

U.S. PATENT DOCUMENTS 5,119,175 A * 6/1992 Long et al. .................. 257/714
5,747,972 A    5/1998 Baretich et al.
6,075,350 A * 6/2000 Peng .............................. 323/207
7,239,036 B2 * 7/2007 D'Atre et al. ................... 290/44
8,008,809 B2 * 8/2011 Nielsen .................... H02J 1/102
                                                                307/82
2006/0034103 A1    2/2006 West
2013/0301314 A1* 11/2013 Fu .......................... H02M 7/487
                                                                363/37
2014/0268960 A1 * 9/2014 Ritter et al. .................... 363/98

FOREIGN PATENT DOCUMENTS

BE    EP 2372893 A1 * 10/2011 ............ H02M 7/487
EP       2372893 A1 * 10/2011
(Continued)

OTHER PUBLICATIONS

Alain Chen et al, A Multilevel Converter Topology with Fault Tolerant Ability, 2004, IEEE.*
(Continued)

*Primary Examiner* — Jessica Han
*Assistant Examiner* — Bart Iliya
(74) *Attorney, Agent, or Firm* — Dority & Manning, P.A.

(57) ABSTRACT

The present subject matter is directed to apparatus and methods for producing a variable frequency output waveform from a power converter for use in a power generation system, such as a wind turbine power generation system. A voltage divider is employed to provide plural voltage levels to which a multi-level bridge circuit employing selectively activated switches in pairs of switches is coupled. The switches are operated in such a fashion as to produce a generally sinusoidal waveform that may be easily filtered by low cost filters due to the plural voltage levels to produce a generally smooth sine wave from the converter. Such converters may be used in various environments including in pairs in multi-phase power converters.

14 Claims, 9 Drawing Sheets

(56) References Cited

FOREIGN PATENT DOCUMENTS

EP 2568591 A1 * 3/2013
WO 2014026824 A2 2/2014

OTHER PUBLICATIONS

EPO Search Report and Written Opinion from corresponding EP Application No. 14179741.5 dated Feb. 23, 2015.

Fang Zheng Peng, "A Generalized Mulilevel Inverter Topology with Self Voltage Balancing", IEEE Transactions on Industry Applications, Piscataway, NJ, USA, vol. 37, No. 2, Mar. 2001.

Alian Chen, et al., "A mulitlevel converter topology with fault tolerant ability" 2004 IEEE Applied Power Electronics Conference and Exposition, APEC 2004, vol. 3, No. 22, Feb. 2004. pp. 1610-1616.

* cited by examiner

| position | State 1 | State 2 | State 3 | State 4 | State 5 | State 6 | State 7 | State 8 |
|---|---|---|---|---|---|---|---|---|
| 1 | off | off | off | off | off | off | off | conducting |
| 2 | off | off | off | off | off | off | conducting | off |
| 3 | off | off | off | off | off | conducting | off | off |
| 4 | off | off | off | off | conducting | off | off | off |
| 5 | off | off | off | conducting | off | off | off | off |
| 6 | off | off | conducting | off | off | off | off | off |
| 7 | off | conducting | off | off | off | off | off | off |
| 8 | conducting | off | off | off | off | off | conducting | conducting |
| 9 | off | off | off | off | conducting | conducting | off | off |
| 10 | off | off | conducting | conducting | off | conducting | off | off |
| 11 | off | conducting | off | off | conducting | off | conducting | off |
| 12 | conducting | off | off | off | off | conducting | off | conducting |
| 13 | off | off | off | conducting | off | off | conducting | off |
| 14 | conducting | conducting | conducting | conducting | off | off | off | conducting |

FIG. 5

| position | State 1 | State 2 | State 3 | State 4 | State 5 | State 6 | State 7 | State 8 |
|---|---|---|---|---|---|---|---|---|
| 1 | off | off | off | off | off | off | off | conducting |
| 2 | on | on | on | on | on | on | conducting | off |
| 3 | off | off | off | off | off | conducting | on | on |
| 4 | on | on | on | on | conducting | on | on | off |
| 5 | off | off | off | conducting | off | off | off | on |
| 6 | on | on | conducting | on | on | on | off | off |
| 7 | off | conducting | on | off | off | off | off | on |
| 8 | conducting | off | off | off | off | off | conducting | conducting |
| 9 | off | off | off | off | conducting | conducting | off | off |
| 10 | on | on | on | conducting | on | on | on | on |
| 11 | off | off | conducting | conducting | off | off | off | off |
| 12 | conducting | conducting | off | off | conducting | conducting | conducting | conducting |
| 13 | off | off | off | off | off | off | off | off |
| 14 | conducting | conducting | conducting | conducting | off | off | off | off |

POWER CONVERTER WITH A MULTI-LEVEL BRIDGE TOPOLOGY AND CONTROL METHOD

FIELD OF THE SUBJECT MATTER

The present subject matter relates generally to the field of power converters in power generation systems, and, more particularly, to systems and methods for providing frequency adjustable output waveforms from such power converters.

BACKGROUND OF THE SUBJECT MATTER

Power generation systems often include a power converter that is configured to convert an input power into a suitable power for application to a load, such as a generator, motor, electrical grid, or other suitable load. For instance, a power generation system, such as a wind turbine system, may include a power converter for converting variable frequency alternating current power generated at the generator into alternating current power at a grid frequency (e.g. 50 Hz or 60 Hz) for application to a utility grid.

Power converters that use switch mode, voltage sourced, Pules Width Modulation (PWM) methods to replace fixed speed mechanically throttled processes have been restricted to a severe tradeoff between operability and efficiency. Mechanical valves and bypass, as well as speed changers, are all part of present state of the art where very large power and reliability has not been proven in power electronics.

Large and costly, as well as wasteful, passive filters have been a part of the limits. Another is a restriction of voltage where single Insulated Gate Bipolar Transistors (IGBT), or their equivalents, are used. When Multiple IGBTs are used creating a high quality waveform becomes one of the concerns, since this helps to reduce the concerns of the passive filtering. Many complicated solutions are being proposed.

In view of these known issues, it would be advantageous, therefore, to develop a simpler method of achieving high voltage, low distortion power converters capable of variable frequency, small footprint, and high efficiency.

BRIEF DESCRIPTION OF THE SUBJECT MATTER

Aspects and advantages of the subject matter will be set forth in part in the following description, or may be obvious from the description, or may be learned through practice of the subject matter.

The present subject matter relates to a power converter comprising a voltage divider configured to provide a plurality of voltage level points. Although not limited to such use, the power converter may have particular usefulness in a wind turbine power generation system. Such power converter corresponds to a multi-level bridge circuit coupled to the plurality of voltage level points, the circuit comprising a first series of pairs of switches coupled individually across adjacent ones of the plurality of voltage level points for selective connection of a common output terminal between individual ones of the pairs of switches to one of the adjacent plurality of voltage level points. In turn, there is also provided a second series of pairs of switches coupled individually across adjacent output terminals between individual ones of the first series of pairs of switches for selective connection of a common output terminal between individual ones of the second series of pairs of switches to one of the common output terminals between said first series of pairs of switches.

The present subject matter also relates to a power converter comprising a first, second, and third series of pairs of switches. In such embodiments, the first series of pairs of switches of each pair of switches have first and second inputs and a common output. Also in such embodiments, the second series of pairs of switches of each pair of switches have first and second inputs coupled to one output of adjacent outputs of adjacent of the first series of pairs of switches and a common output between each of the pairs of the second series of pairs of switches. Finally, the third series of pairs of switches of each pair of switches have first and second inputs coupled to one output of adjacent outputs of adjacent of the second series of pairs of switches a common output between each of the pairs of the third series of pairs of switches.

The present subject matter also relates to a method of generating a variable frequency waveform. According to such method, first and second inputs of a first series of switch pairs are coupled to a multi-level voltage supply and outputs from two of the first series of switch pairs are coupled to a second series of switch pairs. According to such embodiment, individual switches of the first series of switch pairs and second series of switch pairs are selectively controlled to produce a variable frequency waveform based on the multiple voltage levels of the multi-level voltage supply.

These and other features, aspects and advantages of the present subject matter will become better understood with reference to the following description and appended claims. The accompanying drawings, which are incorporated in and constitute a part of this specification, illustrate embodiments of the subject matter and, together with the description, serve to explain the principles of the subject matter.

BRIEF DESCRIPTION OF THE DRAWINGS

A full and enabling disclosure of the present subject matter, including the best mode thereof, directed to one of ordinary skill in the art is set forth in the specification, which makes reference to the appended figures, in which.

Repeat use of reference characters throughout the present specification and appended drawings is intended to represent same or analogous features or elements of the invention.

DETAILED DESCRIPTION OF THE SUBJECT MATTER

As discussed in the Summary of the Subject Matter section, the present subject matter is particularly concerned with providing frequency adjustable output waveforms for power converters.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In accordance with the present subject matter, it has been found that such a converter may be provided for a power generation system, such as wind turbine generator, where, in a multi-phase system, the individual phase legs may be constructed as a progression of multiple similar components but differing in their role in the voltage synthesis. It should be appreciated that while the present subject matter may be more generally directed to multi-phase systems, the disclosed subject matter is equally applicable to single phase environments. Further, while the present subject matter is primarily described as associated with power converter systems, such present subject matter may also be used equally in association with waveform synthesizer systems in general operating at any voltage/power level. For example, the presently disclosed apparatus and methods may readily be employed to produce audio frequency waveforms as well as waveforms in other frequency spectrums. When used in a three-phase power converter configuration, six sets of bridges as herein described may be employed with two bridges used with each phase.

In accordance with the present subject matter, a simple and yet low distortion method of operation is provided. As will be described in greater detail below, efficiencies provided by the present subject matter derive, at least in part, from the high number of levels provided in the bridge configuration, thereby allowing a closer instantaneous voltage match to load conditions where divergence rate to current desired allows for a low switching rate. By use of such systems and methodologies, switching losses are reduced while the need for any additional snubbers, i.e., transient voltage suppressors, is deliberately reduced in expectation that those loses will be reduced by topology and frequency reduction as provided by the present subject matter.

As mentioned, the power converter subject matter of this disclosure may be useful in a wind turbine power generation system. In this regard, a general description of an exemplary wind turbine power generation system is provided with reference to FIGS. 1 and 2.

Figure 1:
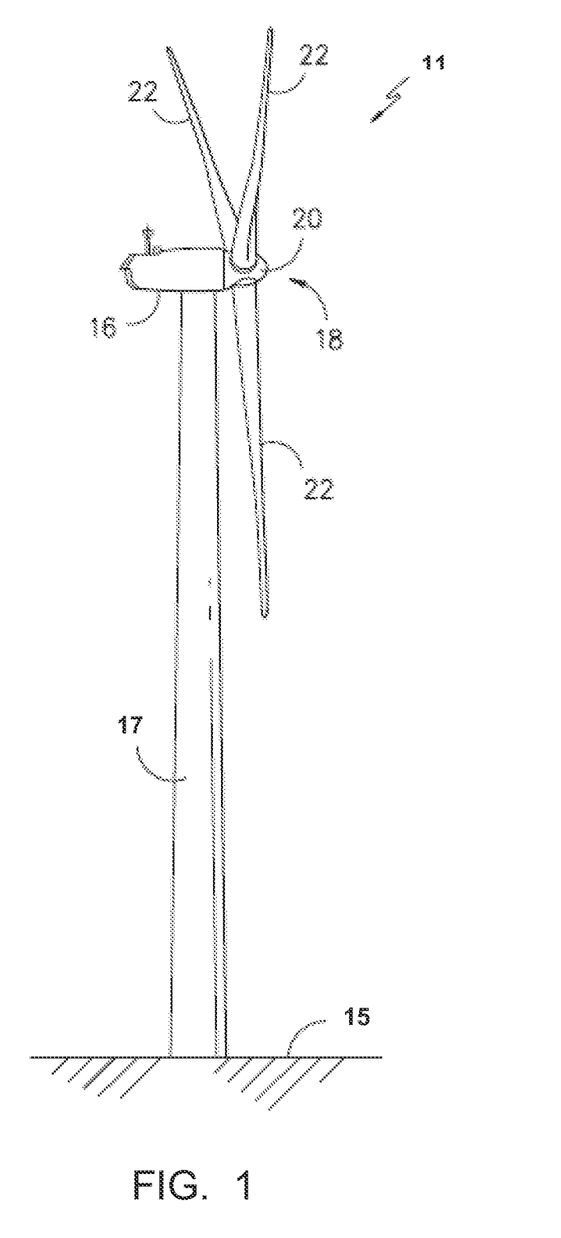
FIG. 1 is perspective view of one embodiment of a conventional wind turbine.

Referring now to the drawings, FIG. 1 illustrates a perspective view of one embodiment of a wind turbine 11. As shown, the wind turbine 11 generally includes a tower 17 extending from a support surface 15, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, as will be described below, the rotor 18 may be rotatably coupled to an electric generator 120 (FIG. 2) to permit electrical energy to be produced.

Figure 2:
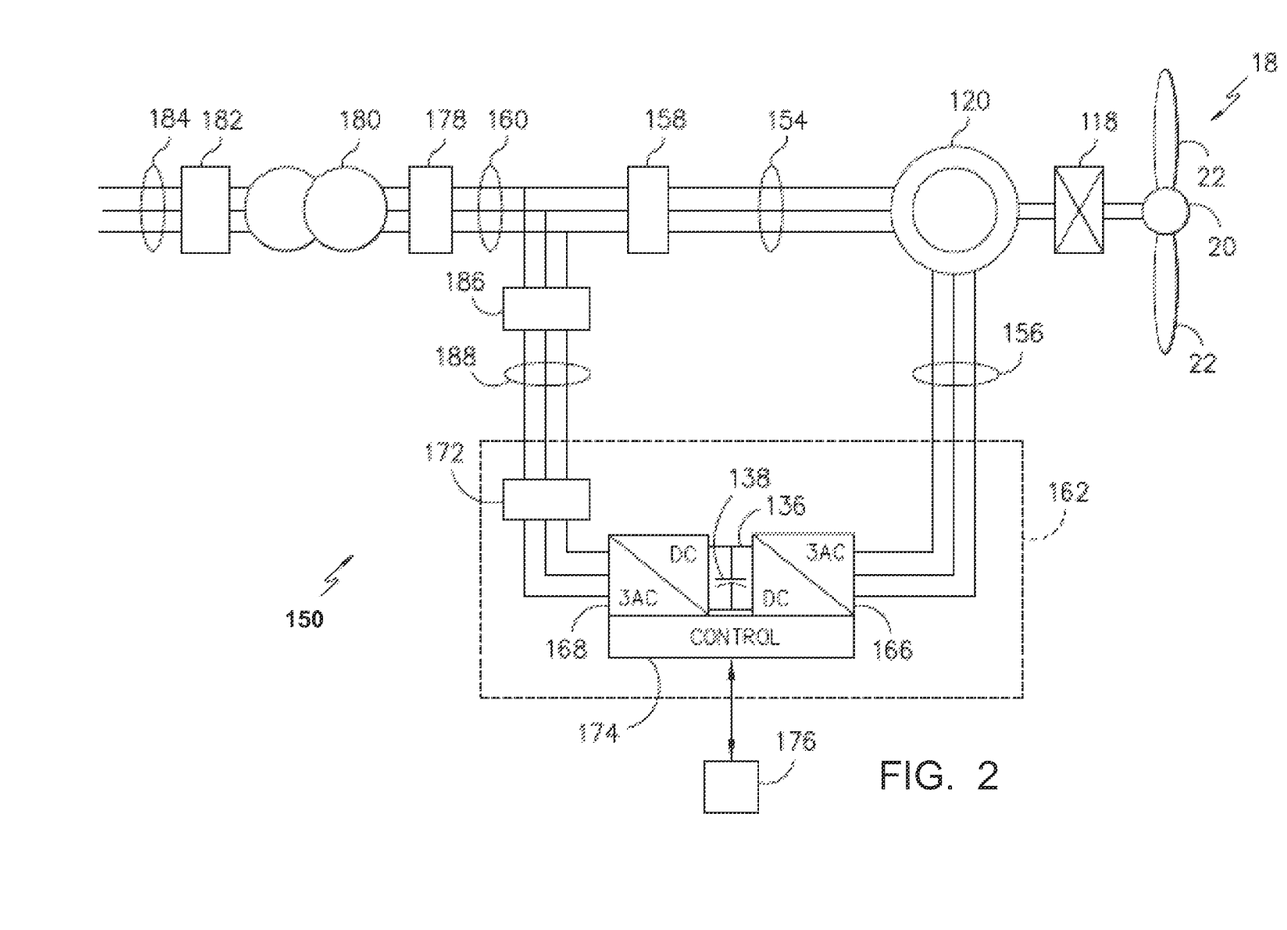
FIG. 2 illustrates a schematic diagram of one embodiment of a wind turbine power generation.

Referring now to FIG. 2, a schematic diagram of one embodiment of a wind turbine power generation system 101, for example a DFIG wind turbine system, is illustrated. It should be appreciated that the present subject matter will generally be described herein with reference to the system 101 shown in FIG. 2. However, those of ordinary skill in the art, using the disclosures provided herein, should understand that aspects of the present disclosure may also be applicable in other power generation systems.

As shown, the rotor 18 of the wind turbine 11 (FIG. 1) may, optionally, be coupled to a gear box 118, which is, in turn, coupled to a generator 120, which may be a doubly fed induction generator (DFIG).

Still referring to FIG. 2, the DFIG 120 may be coupled to a stator bus 154 and a power converter 162 via a rotor bus 156. The stator bus 154 may provide an output multiphase power (e.g. three-phase power) from a stator of the DFIG 120 and the rotor bus 156 may provide an output multiphase power (e.g. three-phase power) from a rotor of the DFIG 120. The power converter 162 includes a rotor side converter 166 and a line side converter 168. The DFIG 120 may be coupled via the rotor bus 156 to the rotor side converter 166. Additionally, the rotor side converter 166 may be coupled to the line side converter 168 which may, in turn, be coupled to a line side bus 188.

As in generally understood, the rotor side converter 166 and the line side converter 168 may be configured for normal operating mode in a three-phase, pulse width modulation (PWM) arrangement using insulated gate bipolar transistor (IGBT) switching elements, as will be discussed in more detail below with reference to specific embodiments of the invention. The rotor side converter 166 and the line side converter 168 may be coupled via a DC link 136 across which is a DC link capacitor 138.

In addition, the power converter 162 may be coupled to a controller 174 in order to control the operation of the rotor side converter 166 and the line side converter 168. It should be noted that the controller 174 may, in several embodiments, be configured as an interface between the power converter 162 and a control system 176. The controller 174 may include any number of control devices. In one embodiment, the controller 174 may include a processing device (e.g. microprocessor, microcontroller, etc.) executing computer-readable instructions stored in a computer-readable medium. The instructions when executed by the processing device may cause the processing device to perform operations, including providing control commands (e.g. switching frequency commands) to the switching elements of the power converter 162.

In typical configurations, various line contactors and circuit breakers including, for example, a grid breaker 182 may also be included for isolating the various components as necessary for normal operation of the DFIG 120 during connection to and disconnection from the electrical grid 184. For example, a system circuit breaker 178 may couple the system bus 160 to a transformer 180, which may be coupled to the electrical grid 184 via the grid breaker 182. In alternative embodiments, fuses may replace some or all of the circuit breakers.

In operation, alternating current power generated at the DFIG 120 by rotating the rotor 18 is provided via a dual path to the electrical grid 184. The dual paths are defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC link 136. As is generally understood, switching elements (e.g. IGBTs) used in the bridge circuits of the rotor side power converter 166 may be modulated to convert the AC power provided from the rotor bus 156 into DC power suitable for the DC link 136.

In addition, the line side converter 168 converts the DC power on the DC link 136 into AC output power suitable for the electrical grid 184. In particular, switching elements (e.g. IGBTs) used in bridge circuits of the line side power converter 168 can be modulated to convert the DC power on the DC link 136 into AC power on the line side bus 188. The AC power from the power converter 162 can be combined with the power from the stator of DFIG 120 to provide multi-phase power (e.g. three-phase power) having a frequency maintained substantially at the frequency of the electrical grid 184 (e.g. 50 Hz or 60 Hz).

Additionally, various circuit breakers and switches, such as grid breaker 182, system breaker 178, stator sync switch 158, converter breaker 186, and line contactor 172 may be included in the system 100 to connect or disconnect corresponding buses, for example, when current flow is excessive and may damage components of the wind turbine system 100 or for other operational considerations. Additional protection components may also be included in the wind turbine system 100.

Moreover, the power converter 162 may receive control signals from, for instance, the control system 176 via the controller 174. The control signals may be based, among other things, on sensed conditions or operating characteristics of the wind turbine system 100. Typically, the control signals provide for control of the operation of the power converter 162. For example, feedback in the form of a sensed speed of the DFIG 120 may be used to control the conversion of the output power from the rotor bus 156 to maintain a proper and balanced multi-phase (e.g. three-phase) power supply. In particular, as will be described below, the sensed speed may be used as a basis for adjusting the switching frequency of the switching elements (e.g., when the DIFG 120 is operating at its synchronous speed). Other feedback from other sensors may also be used by the controller 174 to control the power converter 162, including, for example, stator and rotor bus voltages and current feedbacks. Using the various forms of feedback information, switching control signals (e.g. gate timing commands for IGBTs), stator synchronizing control signals, and circuit breaker signals may be generated.

Reference will not be made various embodiments of a power converter system that may have particular usefulness as the power converter 162 in the wind turbine power generation system described above with respect to FIGS. 1 and 2. However, as previously discussed, the present power converter subject matter is not limited to this use.

Figure 3:
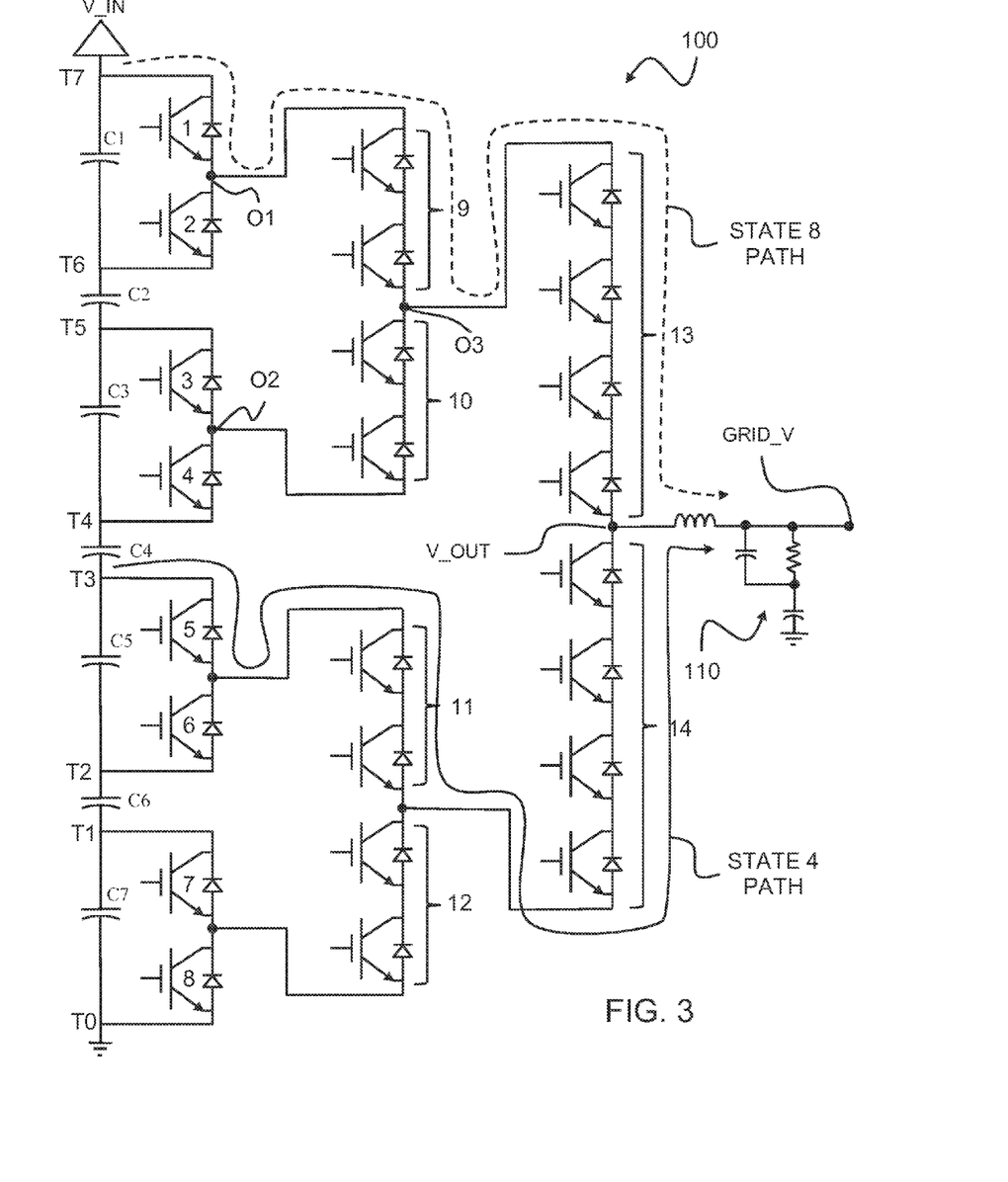
FIG. 3 depicts the topology of an exemplary eight-level bridge employing IGBT's in accordance with the present subject matter.

With respect to the power converter subject matter, reference is directed to FIG. 3, which depicts the topology of an exemplary eight-level bridge employing 24 IGBT's, each associated with a parallel connected reverse direction diode, in accordance with the present subject matter. It should be understood that while the present subject matter primarily illustrates and describes an eight-level topology for the exemplary bridge circuit, the present subject matter is not so limited as the present disclosure may clearly be implemented in other levels, for example six levels or sixteen levels.

With continued reference to FIG. 3, it will be seen that there is represented an exemplary eight-level bridge topology 100 corresponding to a first series of switches designated as switches 1-8, a second series of groups of two switches 9-12, and a third series of groups of four switches 13-14. As illustrated in FIG. 1, each switch of the single switches 1-8, each of the two switches in switch groups 9-12, and each of the four switches in groups 13-14 correspond to individual IGBTs each capable of withstanding the same maximum voltage stress. In an exemplary configuration, such maximum voltage stress may correspond to, for example, 1,000 volts. In such arrangement, switches 1-8 may each withstand, for example, 1,000 volts, while switch groups 9-12 may each withstand 2,000 volts and switch groups 13-14 may withstand 4,000 volts. Those of ordinary skill in the art will appreciate that IGBTs capable of withstanding higher or lower voltage stress levels may be employed depending on particular environment requirements. In one exemplary configuration using a minimum number of low voltage switches, such as 1700V IGBTs, such devices may be employed to create a medium voltage output such as 4160V.

With further reference to FIG. 3, it should be noticed that a voltage divider corresponding to a series of capacitors C1-C8 has been provided coupled between a ground connection and an input voltage level V_IN. Those of ordinary skill in the art will readily appreciate that, when capacitors C1-C8 are provided with the same capacitance value, the voltage level formed across each capacitor C1-C8 will be equal to V_IN/7, thereby providing eight different voltage levels at terminal V_OUT from zero to V_IN volts depending on the conduction state of the various switches 1-8 and switch groups 11-14.

Those of ordinary skill in the art will appreciate that the various voltage levels produced by operation of switches 1-8 and switch groups 9-14 will correspond to substantially discrete voltage levels corresponding to the discrete levels as determined by the voltage dividing operation of the series connection of capacitors C1-C8. Such voltage V_OUT may then be filtered using a relatively simple LRC filter, generally filter 110, to produce a smoother sinusoidal waveform at terminal GRID_V. Because of the relatively higher number of discrete voltage levels produced by the present multi-level bridge topology, filtering requirements for filter 110 are significantly reduced thereby reducing not only physical size of such components but also their cost.

In operation, switches 1 and 2, for example, may be considered to be coupled as a pair of switches to adjacent terminals T6 and T7 so that, when selectively made conductive, switches 1 and 2 may selectively couple the voltage levels at terminal T6 or T7 to common output terminal O1 between switches 1 and 2. Similarly, switches 3 and 4 may selectively couple the voltage level at terminals T4 or T5 to their common output terminal O2. This process is repeated by selectively coupling adjacent output terminal O1 or O2 via the pair of switches constituting switch group 9 and 10 to their common output terminal O3. When applied to all of the switches in switches 1-8 and switch groups 10-11 it may be seen that each of the voltage levels T0-T7 created by the voltage divider may be selectively applied to output terminal V_OUT and, through filter 110 to converter output terminal GRID_V.

Figure 4:
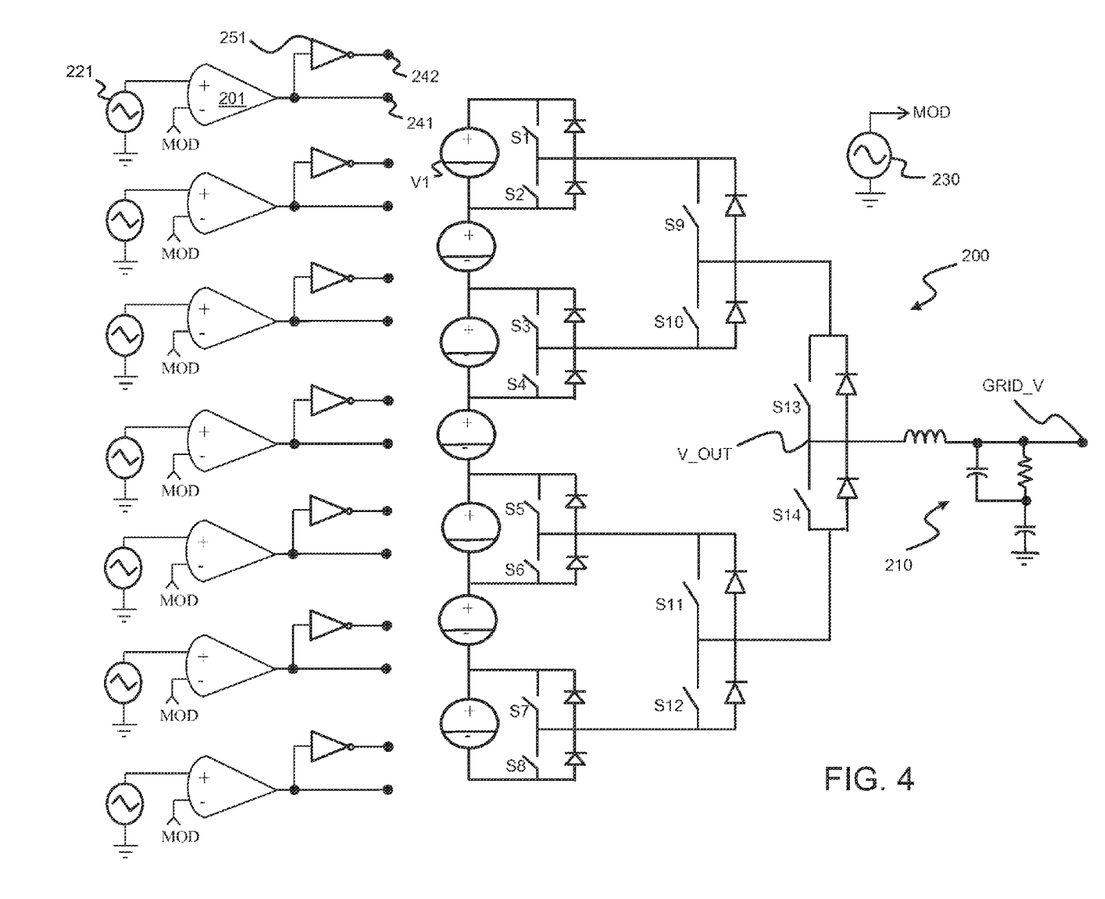
FIG. 4 illustrates an exemplary control scheme for use with the bridge circuit of FIG. 3 employing a "Skip Fire" mode of operation in accordance with the present subject matter.

With reference now to FIG. 4, there is illustrated an exemplary control circuit 200 for use with the bridge circuit of FIG. 3 employing a "Skip Fire" mode of operation in accordance with the present subject matter. As illustrated in FIG. 4, exemplary control 200 includes seven operational amplifiers (comparators), representative by amplifier 201, each having a pair of inputs and an output. The inputs to the seven amplifiers include one input coupled to a triangular wave generator, representative by triangle wave generator 221, and a second input coupled to a sinusoidal modulation generator 230 configured to provide a modulation signal MOD to each of the amplifiers 201. The outputs of amplifiers 201 are each connected directly to a first output terminal, representatively, output terminal 241 and, by way of an inverter, representative by inverter 251, to a second output terminal, representatively, output terminal 242. Those of ordinary skill in the art will appreciate that the signal voltage levels on output terminals 241, 242 will always be at different high or low levels depending on the output level of amplifier 201.

With continued reference to FIG. 4, there are also illustrated equivalent switches representatively illustrated as switches S1, S2, S9, S10, and S13 representative of corresponding switch 1, 2, 9, 10, and 13 of FIG. 3. For clarity sake, all of the various switches illustrated in FIG. 3 are not labeled in FIG. 4 so that the Figure will not become overly cluttered, but it should be appreciated that each switch 1-14 is intended to be equivalently represented in FIG. 4.

Further with reference to FIG. 4, there is also equivalently represented seven voltage sources, representatively, voltage source V1, representing the voltages developed across each of the capacitors C1-C8 (FIG. 3), representative capacitor C1 in FIG. 3. Finally, also is represented filter 210 configured to filter voltages generated at terminal V_OUT and apply such filtered voltages to terminal GRID_V to provide a smoothed output voltage as described previously with respect to FIG. 3.

Figure 5:
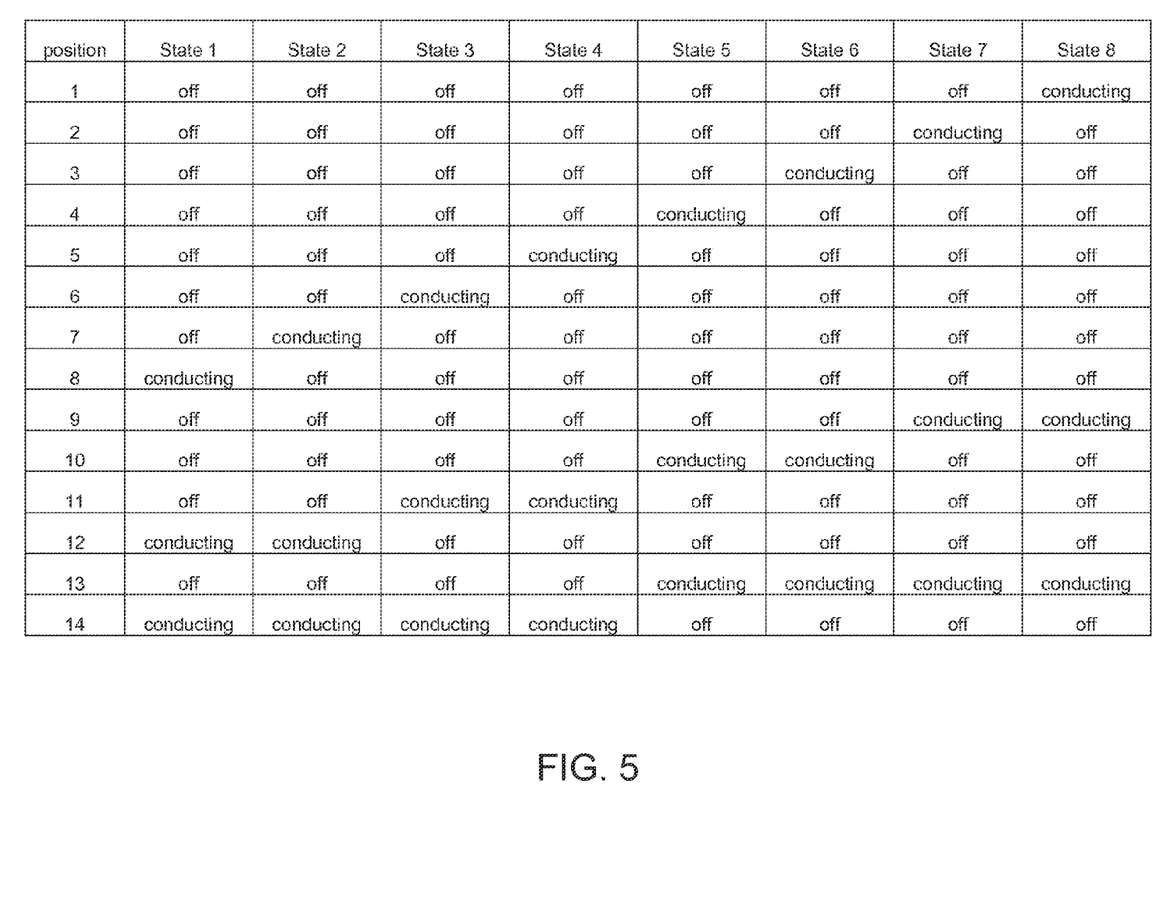
FIG. 5 is a chart illustrating switch positions conducting current for each of the eight-levels (states) of the fourteen separate switch groups corresponding to the exemplary eight-level bridge of FIG. 3.
Figure 6:
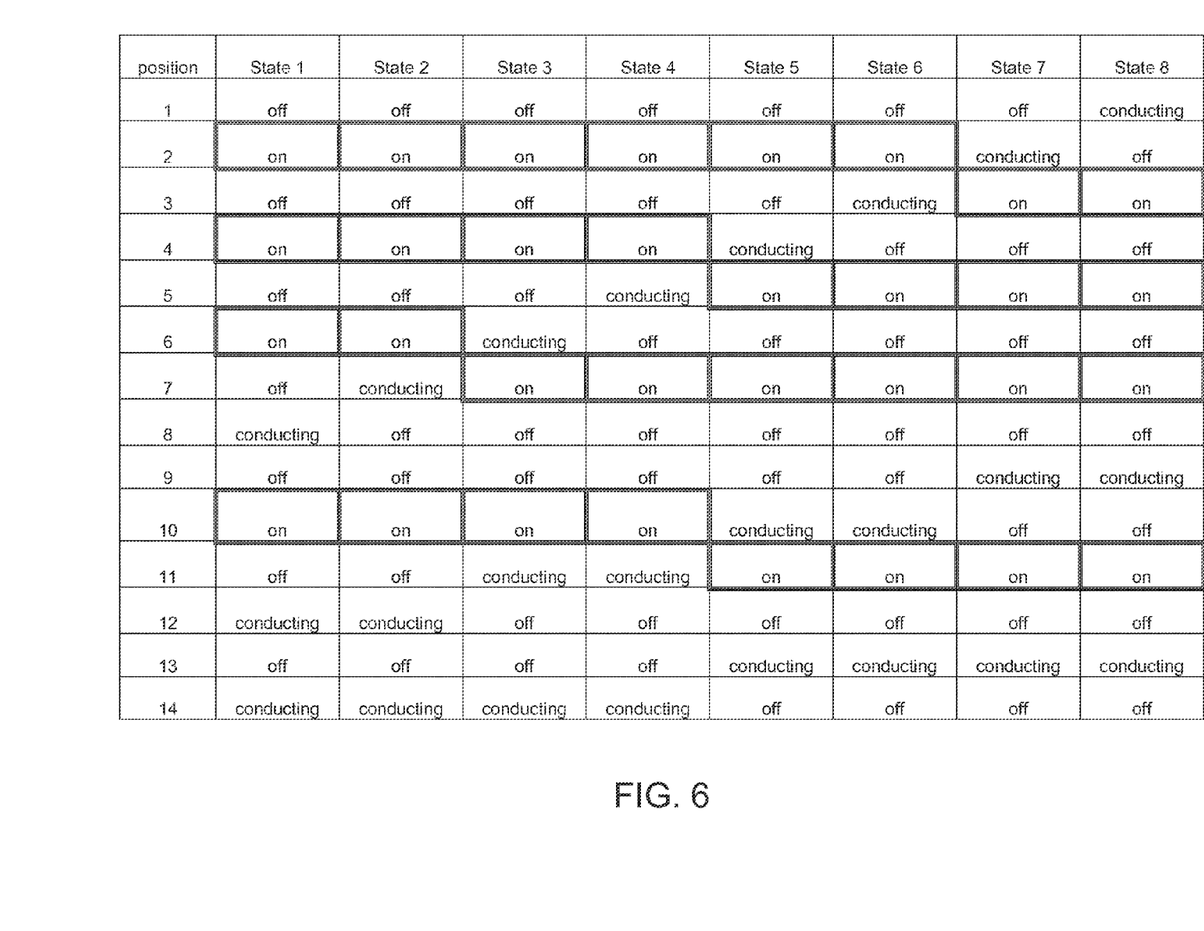
FIG. 6 is a chart illustrating switch positions conducting current for each of the eight-levels (states) and additional gated "ON" switches of the fourteen separate switch groups without employing a "Skip Fire" mode of operation in accordance with a further embodiment of the present subject matter.

Referring now to FIGS. 5 and 6 there are illustrated, respectively, a chart illustrating switch positions conducting current for each of the eight-levels (states) of the fourteen separate switch groups corresponding to the exemplary eight-level bridge of FIG. 3 and various waveforms corresponding to voltage levels at selected points of the exemplary eight-level bridge of FIG. 3. Initially with reference to FIG. 5, it will be appreciated that the conducing state of the various switches in switch positions 1-14 (FIG. 3) has been illustrated for each of eight different states corresponding to states 1-8. For example, and with reference briefly back to FIG. 3, in state 4 the switches in positions 5, 11, and 14 are conductive while the remaining switches of non-conductive, i.e., are "off." Such switch configuration results in a conductive path illustrated in solid line on FIG. 3 as STATE 4 PATH. Similarly, in state 8 as illustrated in FIG. 5, switches in positions 1, 9, and 13 are conductive while the remaining switches are off or non-conducting. This switching arrangement results in the creation of a conductive path illustrated in FIG. 3 as dashed line STATE 8 PATH. The other states illustrated in FIG. 5 produce differing conductive paths based on the illustrated "conducting" or "off" states of the various positions (switches) as illustrated in FIG. 5.

Figure 7:
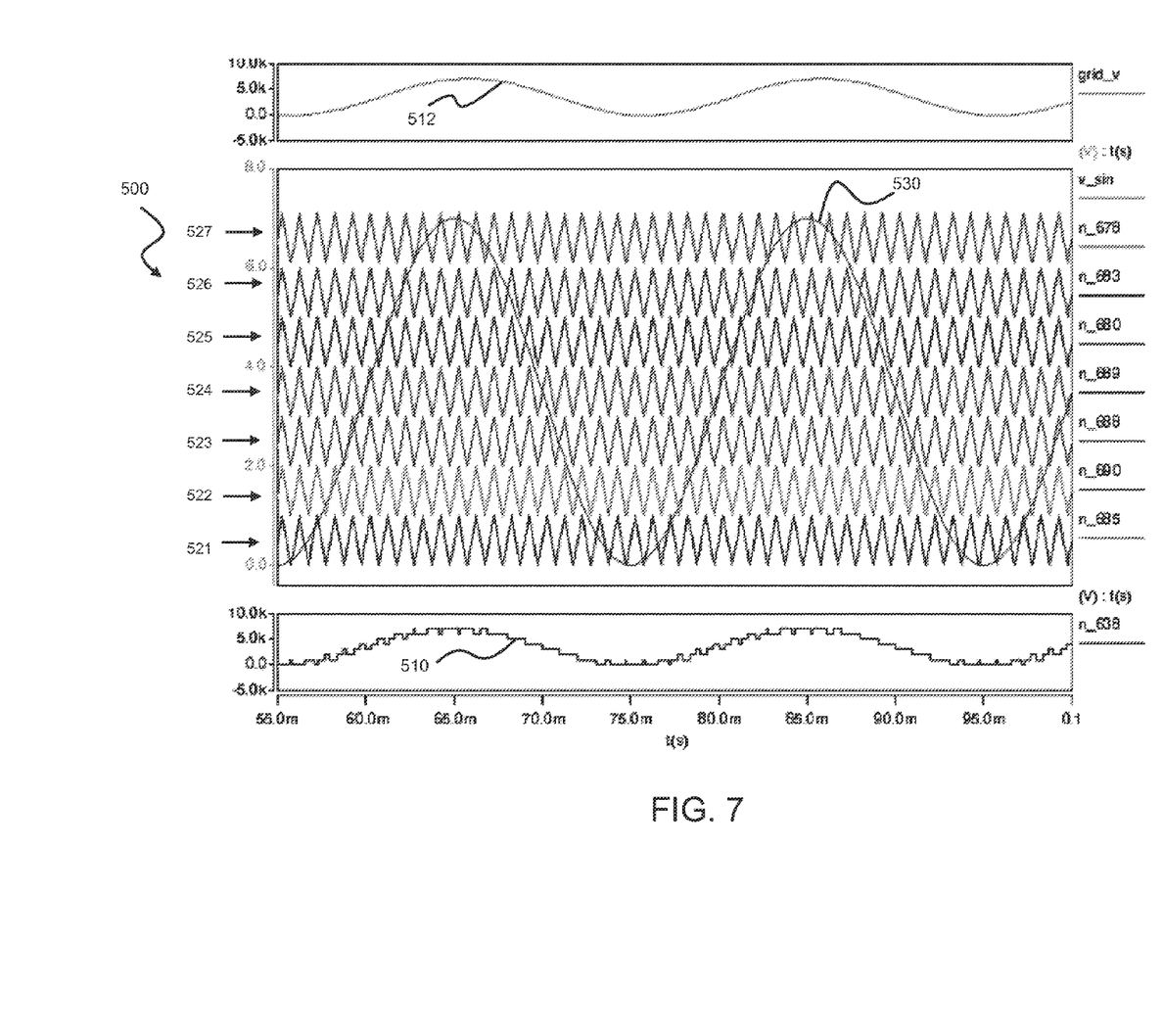
FIG. 7 illustrates various waveforms corresponding to voltage levels at selected points of the exemplary eight-level bridge of FIG. 3.

With reference to FIG. 7, there are illustrated various waveforms 500, corresponding to voltage levels at selected points of the exemplary eight-level bridge of FIG. 3 as the exemplary control circuit of FIG. 4 operates the various switches exemplarily illustrated as switches S1, S2, S9, S10, and S13. For example, waveform 510 illustrates an exemplary waveform appearing at terminal V_OUT in FIGS. 3 and 4. Similarly, waveform 512 is representative of an exemplary waveform appearing at terminal GRID_V also illustrated in FIGS. 3 and 4. Waveforms 521-527 correspond to the triangular waveforms applied from the seven triangular waveform generator, representatively triangular wave form generator, 221. Finally waveform 530 representatively corresponds to the sinusoidal output of modulation generator 230 of FIG. 3.

Figure 8:
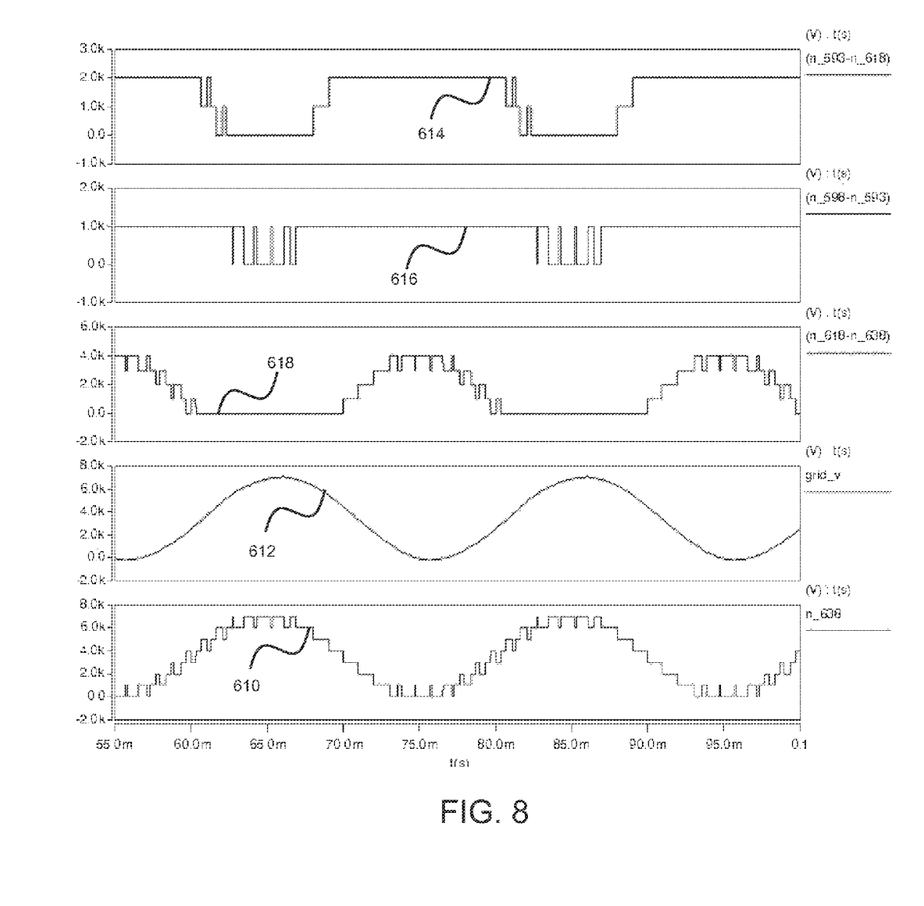
FIG. 8 illustrates further exemplary waveforms of the exemplary eight-level bridge of FIG. 3.

With reference to FIG. 8, there are illustrated further exemplary waveforms of the exemplary eight-level bridge of FIG. 3. For example, waveforms 610 and 612 generally correspond to similar waveforms 510 and 512 of FIG. 7 and are reproduced for comparison with the other waveforms of FIG. 8. Waveform 614 represents the voltage across switch position 9, waveform 616 represents the voltage across switch position 1 and waveform 618 represents the voltage across switch position 13, each position as illustrated in FIG. 3.

With reference to FIG. 6, there is illustrated a chart of switch positions conducting current for each of the eight-levels (states) and additional gated "ON" switches of the fourteen separate switch groups without employing a "Skip Fire" mode of operation as is illustrated in FIG. 5 but also in accordance with a further embodiment of the present subject matter. It will be recalled that in the switching sequence illustrated in FIG. 5, certain switch positions were made "conducting" while the remainder of the switch positions were made "off." This mode of operation was referred to as a "Skip Fire" mode in that the commutation paths allows the development of a mode of operation where IGBTs not conducting current are allowed to remain turned off. Such control scheme permits operation of the bridge by avoiding certain failure modes. On the other hand, operation without "Skip Fire" is also possible wherein certain of the IGBTs may be allowed to be turned on when their operation does not change the current path within the bridge.

With continued reference to the chart illustrated in FIG. 6 and with further reference to FIG. 3, it should be noted that, for example in State 4 the current path is illustrated through switches 5, 11, and 14 in FIG. 3. Per reference to the chart of FIG. 6, it may be observed that during State 4, switches 2, 4, 7, and 10 may be allowed to be conductive, that is, turned on, without adverse effect on the current path through switch positions 5, 11, and 14. In similar fashion, with operation in State 8 including a current path through switch positions 1, 9, and 13, allowing switch positions 3, 5, 7, and 11 to be "on" also does not affect current flow through State 8 Path. As seen from FIG. 6, similar situations appear with the other States.

In light of the above, it should be apparent to those of ordinary skill in the art that a digital implementation of the above described switching arrangement is also possible and such embodiments are fully contemplated by the present disclosure. Such digital embodiments may be implemented using any number of known techniques including, without limitation, microprocessor implementations, application-specific integrated circuit (ASIC) implementations, diode matrix switch implementations, and non-integrated type circuit implementations. In accordance with the present subject matter, any switching circuit that can be configured to control the various switches 1-14 of FIG. 3 according to the patterns illustrated in FIGS. 5 and 6 may be employed to implement the present subject matter.

Figure 9:
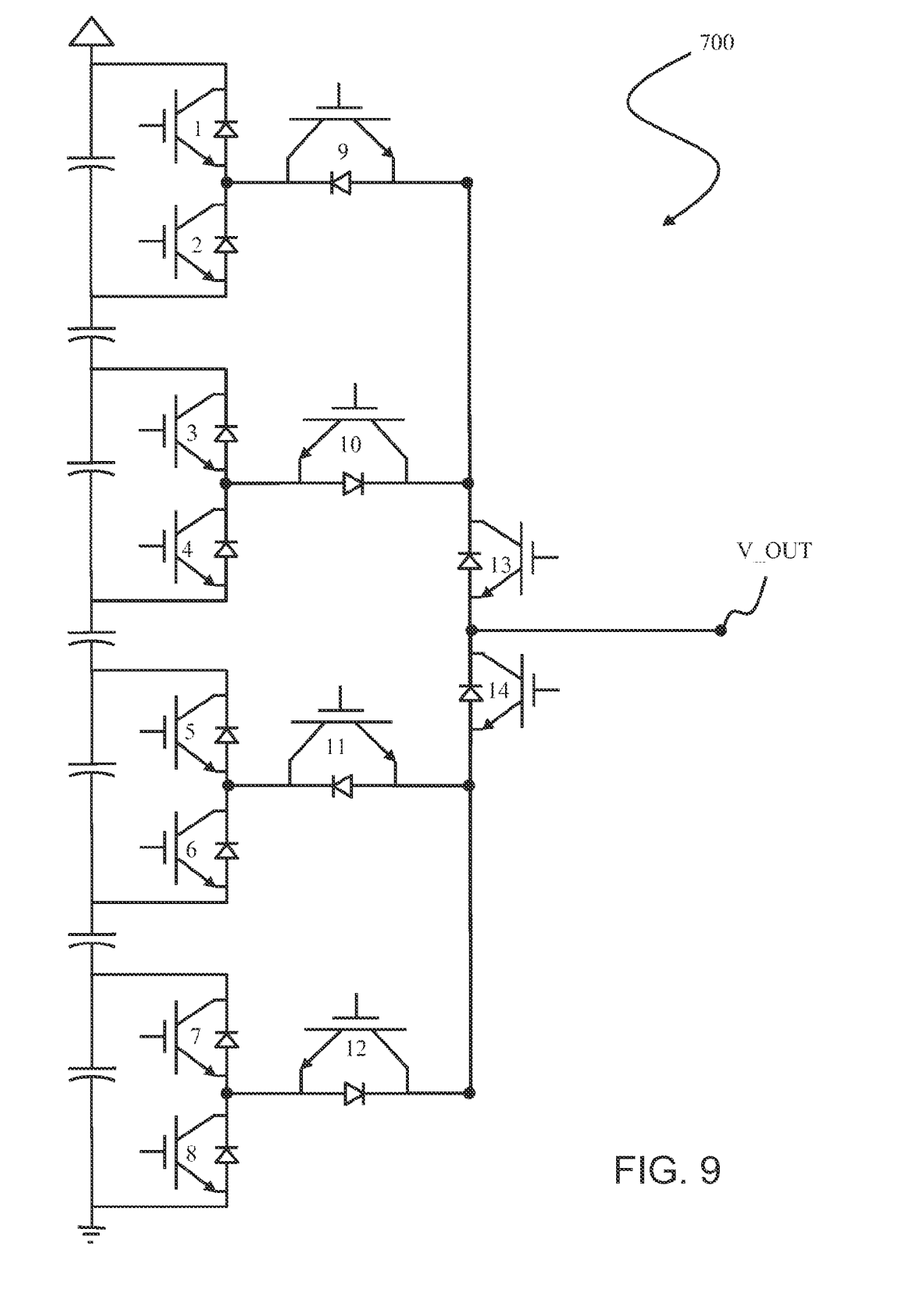
FIG. 9 illustrates the topology of an alternative embodiment of the present subject matter employing higher voltage capable IGBTs (switches).

With reference to FIG. 9, there is illustrated the topology of a bridge 700 constructed in accordance with an alternative embodiment of the present subject matter and employing higher voltage capable IGBTs (switches). In the previously described embodiment, each of the IGBTs in each switch position has the same withstand voltage rating. In accordance with the alternate embodiment illustrated in FIG. 9, those switch positions that previously employed multiple IGDTs are now provided with single IGBTs but of different withstand voltage rating. In the exemplary topology of FIG. 9, switch positions 1-8 that are still occupied by single IGBTs are provided as before. IGBTs located in switch positions 9-12, however, are occupied by switches having at least twice the voltage withstand rating as those in switch positions 1-8. In similar manner, IGBTs occupying switch positions 13 and 14 are occupied with IGBTs having at least four times the rating of the IGBTs occupying switch positions 1-8. In all other respects, the operation of the alternate embodiment bridge 700 is the same as that of the embodiment illustrated in FIG. 3.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A power converter for a wind turbine power generation system, comprising:
    a voltage divider configured to divide a single input voltage into a plurality of equal voltage level points from ground to said input voltage; and
    a multi-level bridge circuit coupled to said voltage level points, said multi-level bridge circuit comprising:
        a first series of pairs of switches connected in series between ground and said input voltage, said pairs selectively coupled individually across different ones of said voltage level points for selective connection of a common output terminal of each said pair to one or the other of said adjacent voltage level points coupled to said pair; and
        a second series of switches divided into second groups, each of said second groups having a plurality of switches, adjacent switches of said second groups selectively coupled individually across one of said common output terminals of said pairs of said first series of switches for selective connection of a common output terminal of each of said second groups to one or the other of said common output terminals of said pairs of said first series of switches coupled to said second groups,
        wherein each switch of said first series of switches and each switch of said second series of switches comprises the same voltage rating.

2. A power converter as in claim 1, further comprising a third series of switches designated as a third group having at least twice as many switches as the second group of switches, wherein said third group is selectively coupled individually across one of said common output terminals of said second groups for selective connection of a common output terminal of said adjacent third groups to one or the other of said common output terminals of said second groups coupled to said third group, wherein each switch of said third series of switches comprises the same voltage rating as said switches of said first series of switches said second series of switches.

3. A power converter as in claim 1, wherein each of said switches comprises a controllable solid state device.

4. A power converter as in claim 3, wherein said controllable solid state device is an insulated gate bipolar transistor (IGBT).

5. A power converter as in claim 4, further comprising a reverse direction diode connected in parallel with said IGBT.

6. A power converter as in claim 1, wherein said voltage divider comprises a plurality of capacitors connected in series.

7. A power converter as in claim 6, wherein each of the capacitors in said series of capacitors are of equal capacitive value.

8. A power converter as in claim 1, wherein each of said pairs of said first series of switches comprise series coupled individual IGBTs and each of said second groups comprise one or a series of coupled IGBTs.

9. A power converter as in claim 1, further comprising a smoothing filter coupled to a converter output terminal.

10. A power converter for a wind turbine power generation system, comprising:
    a voltage divider that divides a single input voltage into a plurality of equal voltage level points from ground to said input voltage;
    a first series of switches connected as pairs of switches, each pair of switches having first and second inputs connected to adjacent different ones of the equal voltage level points and a common output;
    a second series of switches connected as second groups, each said second group having multiple switches, each second group having first and second inputs coupled to adjacent common outputs of said first pairs of switches and a common output; and
    a third series of switches connected as third groups, each said third group having at least twice as many switches as each said second group, the third group of switches having first and second inputs coupled to adjacent common outputs of said second groups of switches and a common output,
    wherein said each switch of the first series of switches, said second series of switches, and said third series of switches each comprise the same voltage rating.

11. A power converter as in claim 10, further comprising:
    a control circuit configured to selectively render conductive selected switches in said first series of switches, said second series of switches, and said third series of switches,
    whereby an output waveform based on said different voltage levels is generated at said common outputs of said pairs of switches, said second groups of switches, and said third group of switches.

12. A power converter as in claim 11, further comprising:
a filter coupled between said common output of said third group of switches and a converter output terminal,
wherein said filter is configured to provide a sinusoidal waveform at said converter output terminal.

13. A power converter as in claim 11, wherein said control circuit is a digital control circuit.

14. A power converter as in claim 10, wherein said voltage divider comprises a capacitive voltage divider.

* * * * *